(12) United States Patent
Lee et al.

(10) Patent No.: US 10,180,749 B2
(45) Date of Patent: Jan. 15, 2019

(54) TOUCH SCREEN PANELS AND METHODS OF MANUFACTURING THE SAME

(71) Applicant: Samsung Display Co., Ltd., Yongin-si (KR)

(72) Inventors: In-Nam Lee, Yongin-si (KR); Sung-Ku Kang, Suwon-si (KR); Joo-Han Bae, Seongnam-si (KR); Dong-Eun Lee, Asan-si (KR); Byeong-Jin Lee, Suwon-si (KR); Choon-Hyop Lee, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/077,484

(22) Filed: Mar. 22, 2016

(65) Prior Publication Data

US 2017/0115800 A1  Apr. 27, 2017

(30) Foreign Application Priority Data

Oct. 22, 2015  (KR) .................. 10-2015-0147033

(51) Int. Cl.
*G06F 3/041* (2006.01)
*G06F 3/044* (2006.01)
*C23F 1/10* (2006.01)
*B82Y 20/00* (2011.01)

(52) U.S. Cl.
CPC .............. *G06F 3/0416* (2013.01); *C23F 1/10* (2013.01); *G06F 3/044* (2013.01); *B82Y 20/00* (2013.01); *G06F 2203/04103* (2013.01); *G06F 2203/04112* (2013.01)

(58) Field of Classification Search
CPC ........... G06F 3/044; G06F 2203/04103; G06F 3/0416; G06F 2203/04112; C23F 1/10; B82Y 20/00
USPC ....................................... 345/174; 178/18.06
See application file for complete search history.

(56) References Cited

U.S. PATENT DOCUMENTS

| | | | | |
|---|---|---|---|---|
| 8,174,505 B2* | 5/2012 | Park | ....................... | G06F 3/0412 |
| | | | | 178/18.01 |
| 2002/0101410 A1* | 8/2002 | Sakata | ..................... | G06F 3/045 |
| | | | | 345/173 |
| 2009/0242283 A1* | 10/2009 | Chiu | ....................... | G06F 3/044 |
| | | | | 178/20.01 |
| 2013/0050107 A1* | 2/2013 | Xie | .......................... | G06F 3/044 |
| | | | | 345/173 |
| 2013/0293482 A1* | 11/2013 | Burns | .................... | B81B 7/0006 |
| | | | | 345/173 |
| 2014/0055379 A1* | 2/2014 | Ma | ........................... | G06F 3/044 |
| | | | | 345/173 |
| 2014/0204047 A1 | 7/2014 | Lai | | |

* cited by examiner

*Primary Examiner* — Stephen G Sherman
(74) *Attorney, Agent, or Firm* — H.C. Park & Associates, PLC (57) ABSTRACT

A touch screen panel includes: a substrate; electrode patterns disposed on the substrate; insulation patterns disposed partially covering the electrode patterns, the insulation patterns defining openings, wherein at least a part of top surfaces of the electrode patterns are exposed through the openings; connecting conductive patterns disposed on the insulation patterns, the connecting conductive patterns filling at least a part of the openings and being electrically connected to the electrode patterns; and wirings disposed on at least a portion of the connecting conductive patterns.

17 Claims, 6 Drawing Sheets

TOUCH SCREEN PANELS AND METHODS OF MANUFACTURING THE SAME

CROSS-REFERENCE TO RELATED APPLICATION

This application claims priority from and the benefit of Korean Patent Application No. 10-2015-0147033, filed on Oct. 22, 2015, which is hereby incorporated by reference for all purposes as if fully set forth herein.

BACKGROUND

Field

Exemplary embodiments relate to touch screen panels including a plurality of conductive layers and methods of manufacturing the same.

Discussion of the Background

A touch screen panel (TSP) is an input device configured to receive a user's instruction by selecting contents displayed on a screen of an image display device with, for example, a human hand or an object. The TSP may substitute for a separate input device such as a keyboard or a mouse that operates by being connected to the image display device, and thus application fields of the TSP are extensive.

The TSP may include a resistive type, a photosensitive type, a capacitive type, or the like. The capacitive TSP may be configured to sense a capacitance change formed between two adjacent conductive sensing patterns and/or between a conductive sensing patterns and a ground electrode when a human hand or an object contacts the TSP, thereby converting a contact position into an electric signal. The capacitive TSP may include electrodes or conductive patterns having a fine pitch and/or a fine width.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a touch screen panel having improved sensitivity and electrical properties and a method of manufacturing a touch screen panel having improved sensitivity and electrical properties.

Additional aspects will be set forth in the detailed description which follows, and, in part, will be apparent from the disclosure, or may be learned by practice of the inventive concept.

An exemplary embodiment discloses a touch screen panel that includes: a substrate; electrode patterns disposed on the substrate; insulation patterns disposed partially covering the electrode patterns, the insulation patterns defining openings, wherein at least a part of top surfaces of the electrode patterns are exposed through the openings; connecting conductive patterns disposed on the insulation patterns, the connecting conductive patterns filling at least a part of the openings and being electrically connected to the electrode patterns; and wirings disposed on at least a portion of the connecting conductive patterns.

An exemplary embodiment also discloses a touch screen panel that includes: a substrate including a sensing region and a wiring region; sensing electrode rows including sensing electrodes; driving electrode columns including driving electrodes; insulation patterns including openings through which sensing electrodes are partially exposed; bridges electrically connecting adjacent sensing electrodes of the sensing electrodes in a row direction, the bridges filling at least a part of the openings of the insulation patterns; a wiring disposed in the wiring region of the substrate; and a junction structure disposed at a boundary between the sensing region and the wiring region, the junction structure electrically connecting a peripheral sensing electrode of the sensing electrodes and the wiring, wherein the sensing electrode rows and the driving electrode columns are disposed crossing each other in the sensing region of the substrate.

An exemplary embodiment further discloses a method of manufacturing a touch screen panel that includes: disposing a metal nanowire layer on a substrate; patterning the metal nanowire layer to form electrode patterns; disposing insulation patterns partially covering the electrode patterns; disposing a transparent conductive oxide layer on the substrate to cover the insulation patterns and the electrode patterns; patterning the transparent conductive oxide layer to form a first connecting conductive pattern and a second connecting conductive pattern, the first connecting conductive pattern electrically connecting adjacent electrode patterns of the electrode patterns, the second connecting conductive pattern disposed partially covering a peripheral electrode pattern of the electrode patterns; disposing a metal layer covering the first connecting conductive pattern and the second connecting conductive pattern; and patterning the metal layer to form a wiring contacting the second connecting conductive pattern.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an" and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense unless, unless expressly so defined herein.

Figure 1:
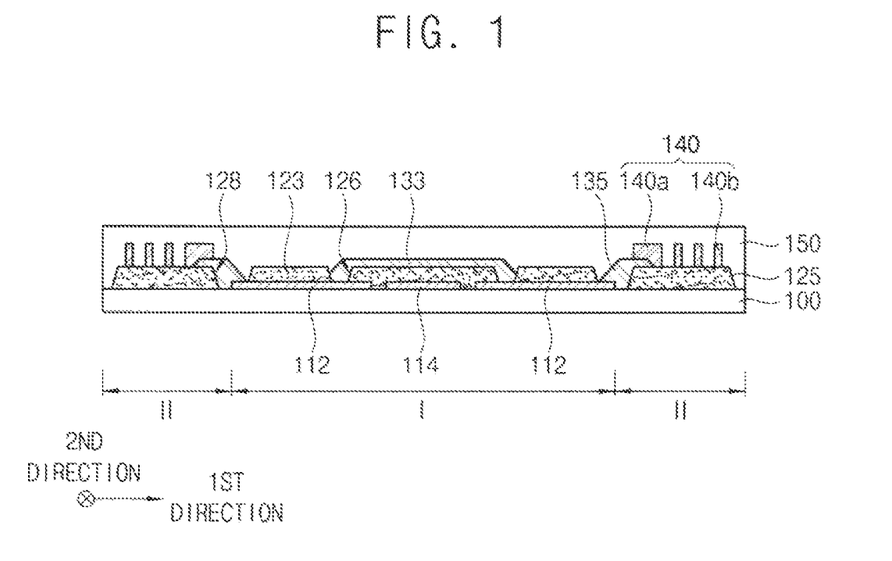
FIG. 1 is a cross-sectional view illustrating a touch screen panel according to one or more exemplary embodiments.

FIG. 1 is a cross-sectional view illustrating a touch screen panel according to one or more embodiments.

Referring to FIG. 1, the touch screen panel (TSP) may include first and second electrode patterns 112 and 114, first and second insulation patterns 123 and 125, first and second connecting conductive patterns 133 and 135, wirings 140, and an insulation layer 150 disposed on a substrate 100.

The TSP may include a first region I and a second region II, and the substrate 100 may be also divided into the first region I and the second region II. According to one or more exemplary embodiments, the first region I may be an active region or a sensing region of the TSP, and the second region II may be provided as an inactive region or a wiring region of the TSP.

The substrate 100 may include a plastic thin film. According to one or more exemplary embodiments, the substrate 100 may include an anisotropic or isotropic thin film. The substrate 100 may include a plastic material such as, but not limited to, polyethylene terephthalate (PET), polyethylene (PE), polycarbonate (PC), cyclic polyolefin (COP), polyimide (PI), cycloolefin copolymer (COC), polyvinyl chloride (PVC), polymethyl methacrylate (PMMA), polypropylene (PP), polystyrene (PS), or the like, and may have a flexible property. According to one or more exemplary embodiments, the substrate 100 may also include a ceramic material, e.g., glass.

The electrode patterns may be disposed on a top surface of the substrate 100 in the first region I. The electrode patterns may include a first electrode pattern 112 and a second electrode pattern 114.

According to one or more exemplary embodiments, a plurality of first electrode patterns 112 may be arranged along a first direction parallel to the top surface of the substrate 100 to form a first electrode row. A plurality of the first electrode rows may be arranged along a second direction that may be parallel to the top surface of the substrate 100 crossing the first direction. For example, the first direction and the second direction may be perpendicular to each other. A plurality of the second electrode patterns 114 may be arranged along the second direction to form a second electrode column, and a plurality of the second electrode columns may be arranged along the first direction.

As described above, a plurality of the first and second electrode patterns 112 and 114 may be arranged on the top surface of the substrate 100 in the first region I in various shapes including, but not limited to, a honeycomb shape, a mesh shape and/or a net shape.

According to one or more exemplary embodiments, the first and second electrode patterns 112 and 114 may include a metal nanowire. For example, the first and second electrode patterns 112 and 114 may include a nanowire including gold (Au), silver (Ag), copper (Cu), aluminum (Al), etc. According to one or more exemplary embodiments, the first and second electrode patterns 112 and 114 may include a silver nanowire (AgNW).

According to one or more exemplary embodiments, the first and second electrode patterns 112 and 114 may include the metal nanowire in which a photosensitive material may be included or embedded.

For example, the first electrode pattern 112 may be a sensing electrode. In this case, a sensing electrode row may be formed by extending the sensing electrode in the first direction, and a plurality of the sensing electrode rows may be arranged along the second direction.

Accordingly, the second electrode pattern 114 may be a driving electrode. In this case, a driving electrode column may be formed by extending the driving electrode in the second direction, and a plurality of the driving electrode columns may be arranged along the first direction.

The first and second insulation patterns 123 and 125 may be formed on the top surface of the first and second electrode patterns 112 and 114 and the substrate 100, respectively. According to one or more exemplary embodiments, the first and second insulation patterns 123 and 125 may include a first insulation pattern 123 and a second insulation pattern 125. The first insulation pattern 123 may be disposed in the first region I, and may partially cover the first and second electrode patterns 112 and 114. The second insulation pattern 125 may be disposed in the second region II, and may be in contact with the top surface of the substrate 100.

The first insulation patterns 123 may cover the second electrode pattern 114, and may partially cover the first electrode pattern 112. A first portion of the first insulation patterns 123 may cover the second electrode pattern 114, and may partially cover the first electrode patterns 112 disposed adjacent to respective ends of the second electrode pattern 114. A second portion of the first insulation patterns 123 may partially cover a top surface of the first electrode pattern 112.

According to one or more exemplary embodiments, a first opening 126 may be defined between the first portion of the first insulation patterns 123 and the second portion of the first insulation patterns 123 in the first direction in the first region I. The top surface of the first electrode pattern 112 may be exposed through the first opening 126.

A second opening 128 may be defined between the second portion of the first insulation pattern 123 and the second insulation pattern 125. The top surface of the first electrode pattern 112 may be exposed through the second opening 128, and the top surface of the substrate 100 may be also exposed through the second opening 128. The second opening 128 may be formed at a boundary between the first region I and the second region II.

According to one or more exemplary embodiments, the first and second openings 126 and 128 may have a substantially contact hole shape.

According to one or more exemplary embodiments, the first and second insulation patterns 123 and 125 may include an organic material including, but not limited to, a polyimide-based resin, a polyacryl-based resin, an epoxy-based resin, etc. According to one or more exemplary embodiments, the first and second insulation patterns 123 and 125 may include an inorganic material including, but not limited to, silicon oxide, silicon nitride, etc.

The first and second connecting conductive patterns 133 and 135 may be disposed on the first and second insulation patterns 123 and 125. The first and second connecting conductive patterns 133 and 135 may include a first connecting conductive pattern 133, and a second connecting conductive pattern 135 disposed throughout the first region I and the second region II.

The first connecting conductive pattern 133 may be disposed on the first portion of the first insulation pattern 123, and may at least fill the first opening 126. The first connecting conductive pattern 133 may directly contact the top surface of the first electrode pattern 112 exposed through the first opening 126.

According to one or more exemplary embodiments, one of the first connecting conductive patterns 133 may fill both of the first openings 126 disposed adjacent to the respective sides of the second electrode pattern 114 in the first direction. Accordingly, the first electrode patterns 112 neighboring in the first direction may be electrically connected to each other by the first connecting conductive pattern 133. A first electrode pattern row (which may be the sensing electrode row) may include a plurality of the first electrode patterns 112 arranged along the first direction and the first connecting conductive patterns 133. Accordingly, the first connecting conductive pattern 133 may be a bridge connecting the neighboring sensing electrodes.

The second connecting conductive pattern 135 may be disposed on the second insulation pattern 125 and may at least partially fill the second opening 128. The second connecting conductive pattern 135 may directly contact the top surface of the first electrode pattern 112 exposed through the second opening 128.

The second connecting conductive pattern 135 may contact an end portion of the first electrode pattern 112 disposed at a peripheral area of the first region I. The second connecting conductive pattern 135 may extend along a sidewall of the second insulation pattern 125, and may cover a portion of a top surface of the second insulation pattern 125.

According to one or more exemplary embodiments, the first and second connecting conductive patterns 133 and 135 may include a conductive oxide. For example, the first and second connecting conductive patterns 133 and 135 may include a transparent conductive oxide such as indium tin oxide (ITO), aluminum zinc oxide (AZO), aluminum tin oxide (ATO), gallium zinc oxide (GZO), or the like.

The wirings 140 may be disposed on the second insulation pattern 125, and at least a portion of the wirings 140 may be in contact with the second connecting conductive pattern 135.

According to one or more exemplary embodiments, the wirings 140 may include a first wiring 140a and a second wiring 140b. The first wiring 140a may contact the second connecting conductive pattern 135, and may extend in, e.g., the second direction. The second wiring 140b may be spaced apart from the first wiring 140a, and may extend on the second insulation pattern 125 in parallel with the first wiring 140a.

Accordingly, the first electrode pattern 112 disposed in the peripheral area of the first region I and the first wiring 140a disposed in the second region II may be electrically connected to each other by the second connecting conductive pattern 135. For example, the second connecting conductive pattern 135 may serve as a junction structure.

According to one or more exemplary embodiments, the first wiring 140a may serve as a sensing line contacting the junction structure, and the second wiring 140b may serve as a driving line.

According to one or more exemplary embodiments, the wirings 140 may include a metal having a low resistance including, but not limited to, copper, aluminum, tungsten, etc.

The insulation layer 150 may be disposed on the substrate 100 on both the first region I and the second region II, and may cover above described elements and/or structures. The insulation layer 150 may include an organic material such as, but not limited to, a polyimide-based resin, a polyacryl-based resin, an epoxy-based resin, etc., and/or an inorganic material such as, but not limited to, silicon oxide, silicon nitride, etc.

FIGS. 2, 3, 4, 5, and 6 are cross-sectional views illustrating a method of manufacturing a touch screen panel according to one or more exemplary embodiments. For example, FIGS. 2, 3, 4, 5, and 6 illustrate a method of manufacturing the TSP of FIG. 1.

Figure 2:
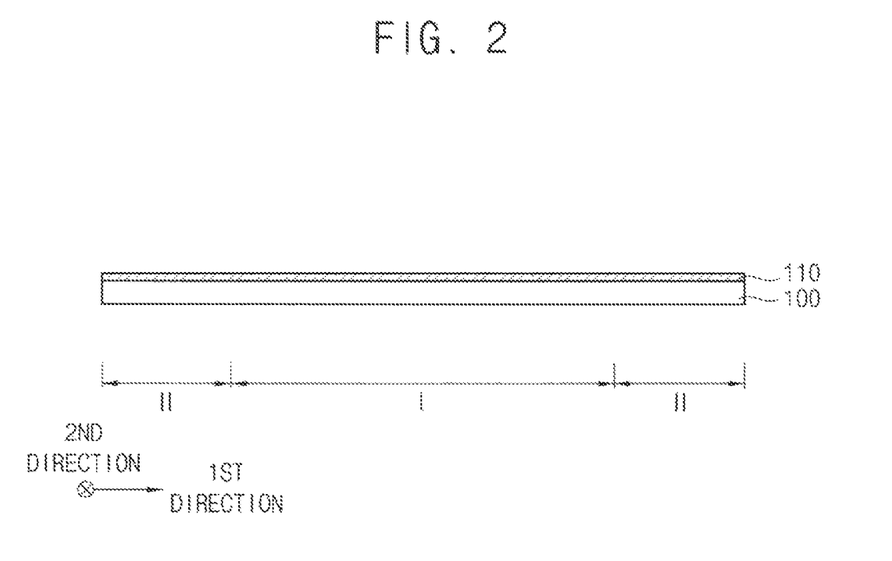
FIGS. 2, 3, 4, 5, and 6 are cross-sectional views illustrating a method of manufacturing a touch screen panel according to one or more exemplary embodiments.

Referring to FIG. 2, an electrode layer 110 may be disposed on a substrate 100.

According to one or more exemplary embodiments, the substrate 100 may include a plastic thin film including, but not limited to, PET, PE, PC, COP, PI, COC, PVC, PMMA, PP, PS, etc. The substrate 100 may include a ceramic material. The substrate 100 may be divided into a first region I configured as a sensing region, and a second region II configured as a wiring region.

The electrode layer 110 may be formed by coating a nanowire of a metal including at least one of Au, Ag, Cu, Al, and the like. According to one or more exemplary embodiments, the electrode layer 110 may be formed by a coating a mixture of the metal nanowire and a photosensitive material.

The thickness of the electrode layer 110 may be reduced by using the metal nanowire when compared to comparative embodiments which includes, e.g., a metal paste for forming the electrode layer 110. Further, the TSP may have an improved flexible property by combining the substrate 100 including the plastic thin film and the electrode layer 110.

Figure 3:
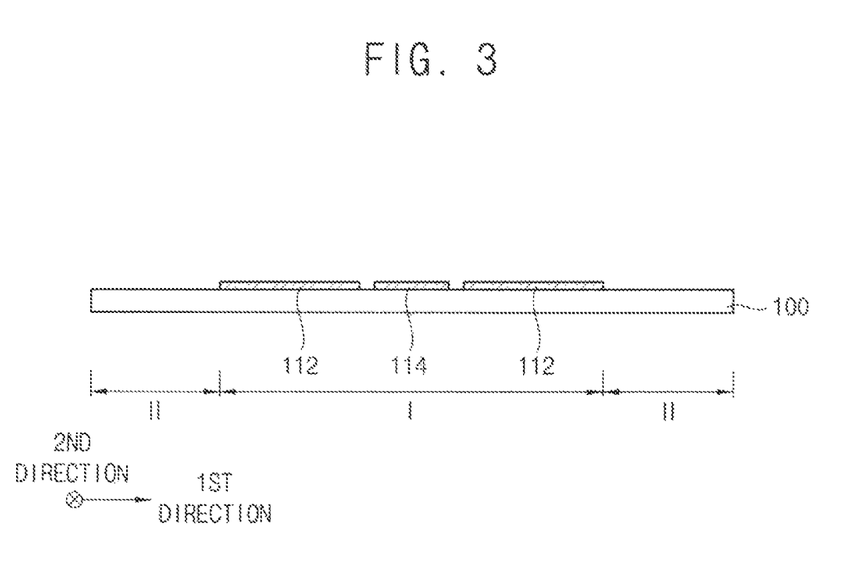

Referring to FIG. 3, the electrode layer 110 may be patterned to form the first and second electrode patterns 112 and 114.

According to one or more exemplary embodiments, the electrode layer 110 including the mixture of the metal nanowire and the photosensitive material may be formed performing a first photo process, which may include exposure and developing processes, directly on the electrode layer 110 to form the first and second electrode patterns 112 and 114.

Referring back to FIG. 1, the electrode patterns may include a first electrode pattern 112 and a second electrode pattern 114 which may be a sensing electrode and a driving electrode, respectively.

Accordingly, the electrode layer 110 may include the metal nanowire, and therefore, the first and second electrode patterns 112 and 114 may have a fine thickness, a fine width and/or a fine pitch.

Figure 4:
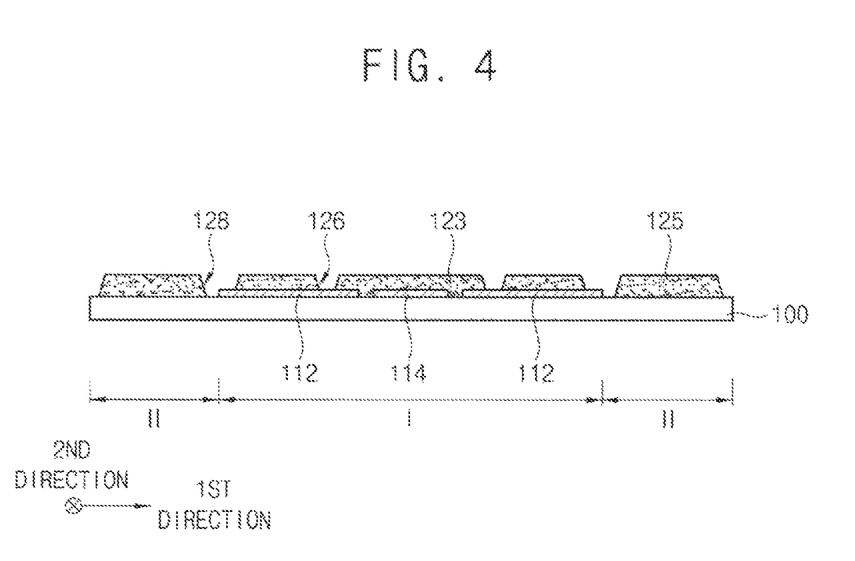

Referring to FIG. 4, the first and second insulation patterns 123 and 125 may be formed on the substrate 100 and the first and second electrode patterns 112 and 114.

According to one or more exemplary embodiments, the first and second insulation patterns 123 and 125 may include an organic material formed by, e.g., a slit coating process or a printing process. According to one or more exemplary embodiments, an insulation layer including an inorganic material may be disposed to cover the first and second electrode patterns 112 and 114, and the insulation layer may be partially etched to form the first and second insulation patterns 123 and 125.

The insulation patterns may include a first insulation pattern 123 and a second insulation pattern 125 disposed in the first region I and the second region II, respectively. A first portion of the first insulation patterns 123 may substantially cover all of the second electrode pattern 114 and partially cover the first electrode patterns 112 disposed adjacent to the second electrode pattern 114. A second portion of the first insulation patterns 123 may partially cover a top surface of the first electrode pattern 112. The second insulation pattern 125 may be formed on a top surface of the substrate 100 in the second region II.

A first opening 126 may be formed between the first portion of the first insulation patterns 123 and the second portion of first insulation patterns 123 disposed adjacent in the first direction to expose at least a part of the top surface of the first electrode pattern 112. A second opening 128 may be formed between the second portion of the first insulation pattern 123 and the second insulation pattern 125. The second opening 128 may be formed at a boundary between the first region I and the second region II. For example, the top surface of the first electrode pattern 112 formed at a peripheral portion of the first region I may be exposed through the second opening 128.

Figure 5:
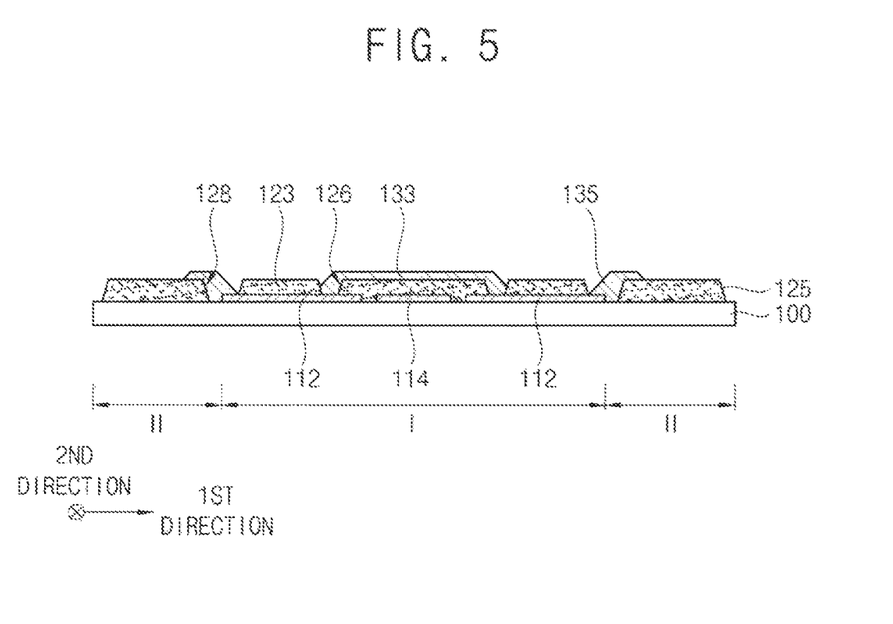

Referring to FIG. 5, first and second connecting conductive patterns 133 and 135 may be formed on the first and second insulation patterns 123 and 125.

According to one or more exemplary embodiments, a first conductive layer covering the first and second insulation patterns 123 and 125 may include a transparent conductive oxide such as ITO, AZO, ATO, GZO, etc., disposed on the substrate 100. For example, the first conductive layer may be deposited by a sputtering process. The first conductive layer may be patterned by a wet etching process using an etchant solution having an etching selectivity for the transparent conductive oxide to form the first and second connecting conductive patterns 133 and 135.

Referring back to FIG. 1, a first connecting conductive pattern 133 filling the first opening 126 may be disposed in the first region I, and the first electrode patterns 112 may be electrically connected to each other by the first connecting conductive pattern 133. A second connecting conductive pattern 135 filling the second opening 128 may be disposed at the boundary between the first region I and the second region II, and may contact a peripheral portion of the first electrode pattern 112.

The first and second connecting conductive patterns 133 and 135 may include the transparent conductive oxide finely patterned by, e.g., a wet etching process. Accordingly, the TSP may also have improved transparency.

Figure 6:
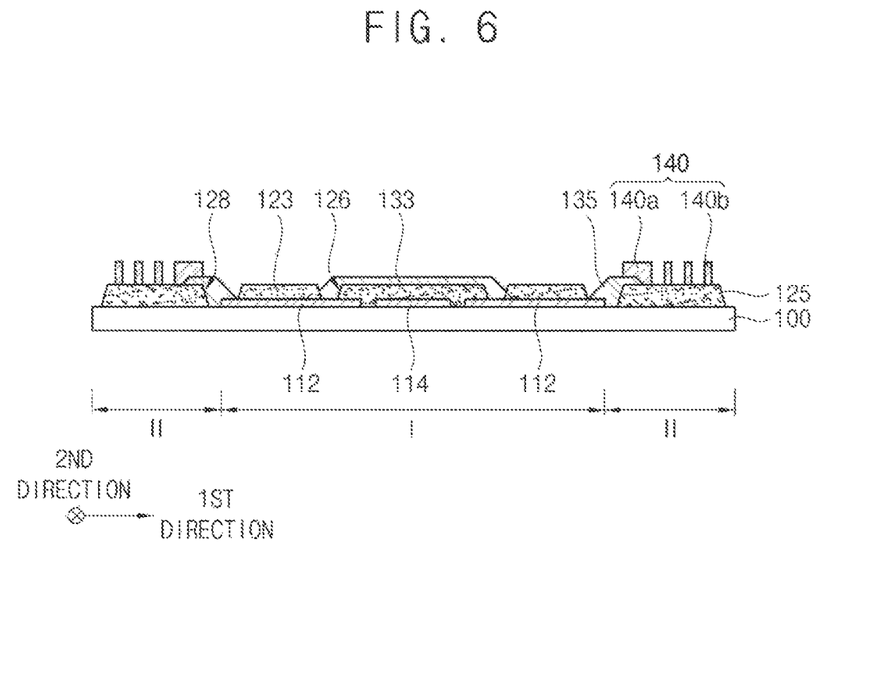

Referring to FIG. 6, wirings 140 may be disposed in the second region II. According to one or more exemplary embodiments, a second conductive layer including a low resistance metal such as copper, tungsten, aluminum, or the like, may be disposed on the first and second insulation patterns 123 and 125 and the first and second connecting conductive patterns 133 and 135 by, e.g., a sputtering process. The second conductive layer may be patterned by a wet etching process using an etchant solution, for example, an acidic solution or a peroxide-based solution, that may have an etching selectivity for a metal to form the wirings 140.

The first and second electrode patterns 112 and 114 may be protected by the first and second insulation patterns 123 and 125 and/or the first and second connecting conductive patterns 133 and 135 during the etching process for forming the wirings 140. Thus, etching damages of the first and second electrode patterns 112 and 114 may be reduced.

The wirings 140 may include a first wiring 140*a* serving as, e.g., a sensing line, and a second wiring 140*b* serving as, e.g., a driving line. The first and second wirings 140*a* and 140*b* may extend in the second direction disposed on the second insulation pattern 125. The first wiring 140*a* may be in contact with the second connecting conductive pattern 135, and may be electrically connected to the peripheral portion of the first electrode pattern 112.

Subsequently, an insulation layer 150 (refer to FIG. 1) may be disposed on the substrate 100 covering the wirings 140, the first and second insulation patterns 123 and 125, and the first and second connecting conductive patterns 133 and 135, according to the TSP illustrated in FIG. 1. The insulation layer 150 may include an organic material or an inorganic material disposed by, e.g., a spin coating process, a chemical vapor deposition (CVD) process, and/or a sputtering process.

According to one or more exemplary embodiments, the first and second electrode patterns 112 and 114 including a metal nanowire may have fine thickness and pitch and a flexible property. The first and second insulation patterns 123 and 125, and the first and second connecting conductive patterns 133 and 135 may be disposed on the first and second electrode patterns 112 and 114, and then the wirings 140 may be disposed thereon. Thus, the first and second electrode patterns 112 and 114 may be protected from etching damage. The first and second connecting conductive patterns 133 and 135 including the transparent conductive oxide may be disposed in the openings defined by the first and second insulation patterns 123 and 125. Thus, an interconnection structure such as a bridge or a junction structure may be protected from the etching process for forming the wirings 140 (including a metal). Accordingly, the TSP may have improved mechanical stability, transparency, and flexibility.

Figure 7:
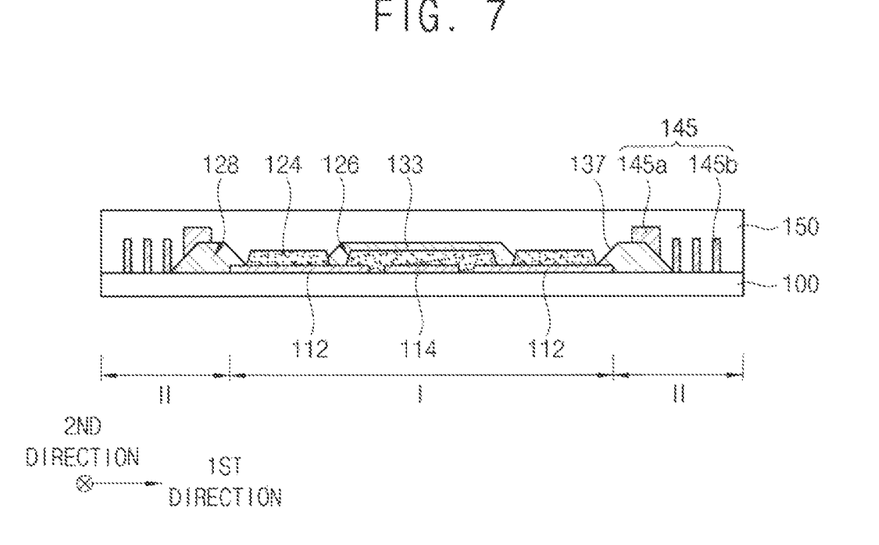
FIG. 7 is a cross-sectional view illustrating a touch screen panel according to one or more exemplary embodiments.

FIG. 7 is a cross-sectional view illustrating a touch screen panel according to one or more exemplary embodiments. The TSP illustrated in FIG. 7 may have elements and/or constructions substantially identical or similar to those illustrated with reference to FIG. 1 except for constructions of wirings and insulation patterns. Accordingly, detailed descriptions of the identical or similar elements and/or structures are omitted hereafter.

Referring to FIG. 7, an insulation pattern 124 may be disposed selectively in the first region I. The second insulation pattern 125 illustrated in FIG. 1 may be omitted from the second region II. Accordingly, at least a portion of wirings 145 may be disposed directly on a top surface of the substrate 100 in the second region II.

According to one or more exemplary embodiments, a first wiring 145*a* may be in contact with a portion of a second connecting conductive pattern 137. In an exemplary embodiment, the first wiring 145*a* may be in contact with a sidewall of the second connecting conductive pattern 137. In an exemplary embodiment, a bottom of the first wiring 145*a* may be also in contact with the top surface of the substrate 100. A second wiring 145*b* may be in contact with the top surface of the substrate 100.

According to one or more exemplary embodiments, the insulation pattern may be omitted in the second region II, and a height of the wiring 145 may be reduced. Accordingly, the TSP may have reduced thickness.

Figure 8:
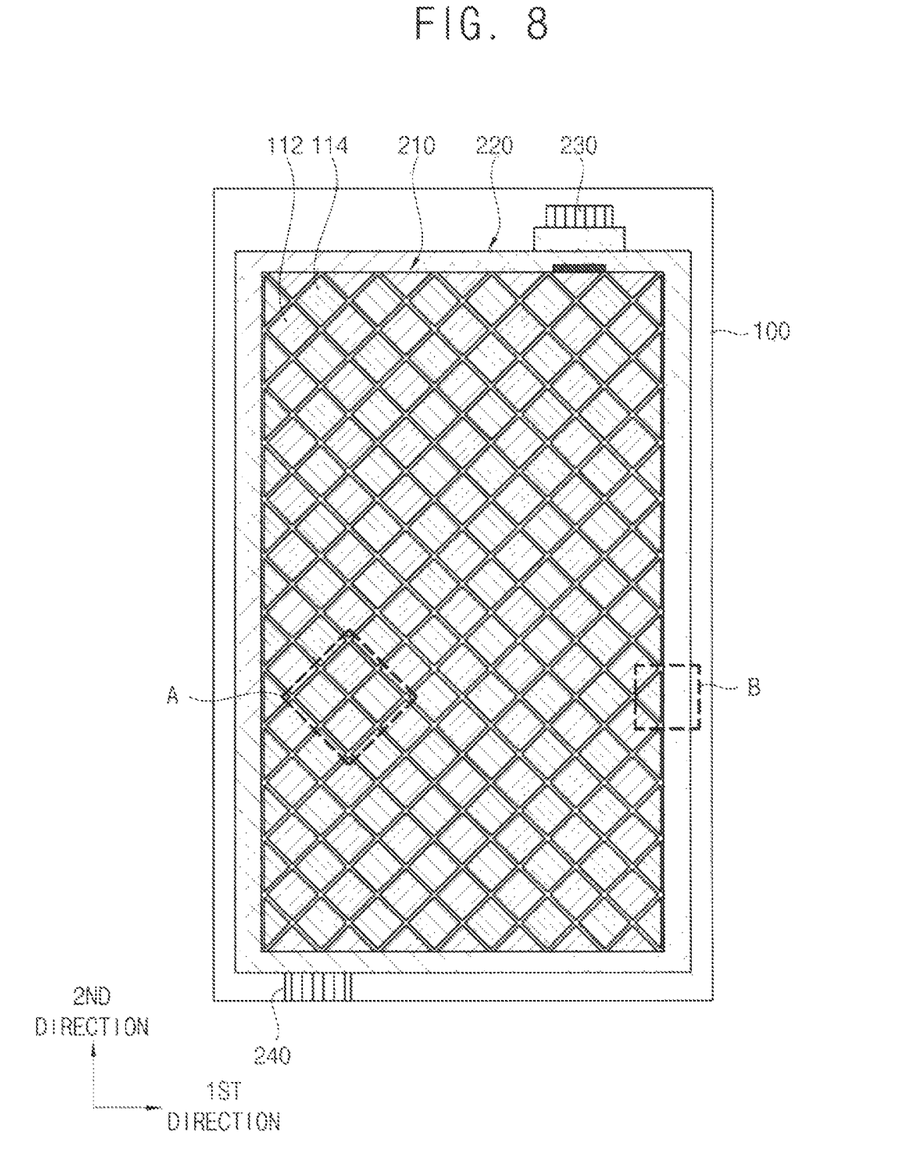
FIG. 8 is a top plan view illustrating a touch screen panel according to one or more exemplary embodiments.
Figure 9:
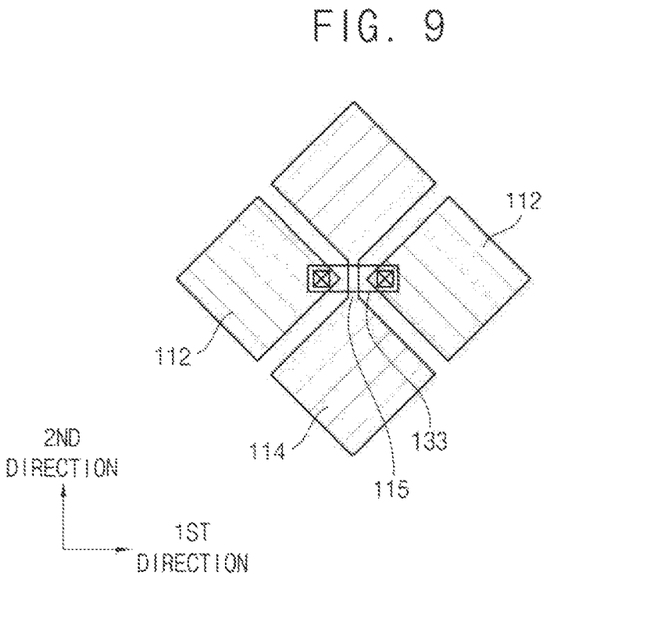
FIG. 9 is an enlarged top plan view of a portion "A" indicated in FIG. 8, according to one or more exemplary embodiments.
Figure 10:
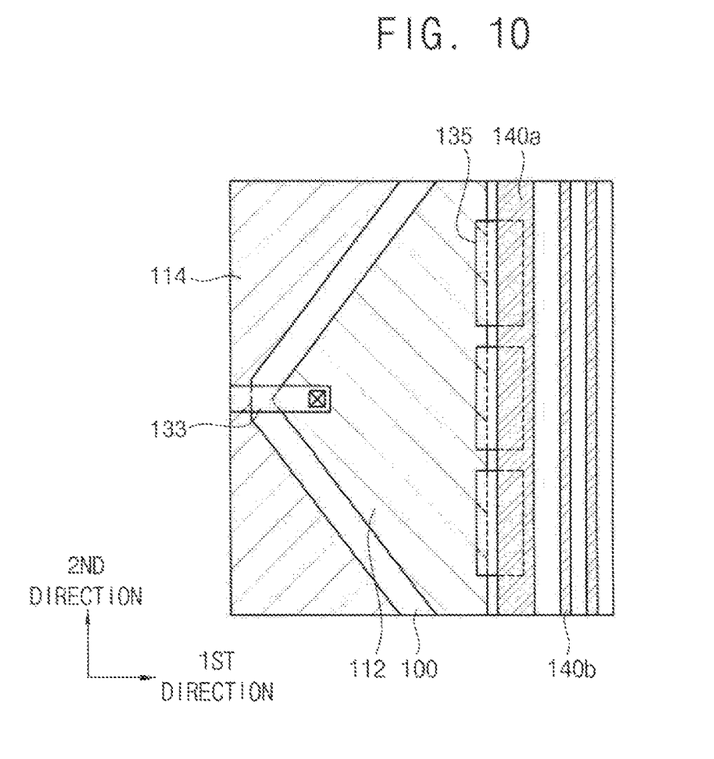
FIG. 10 is an enlarged top plan view of a portion "B" indicated in FIG. 8, according to one or more exemplary embodiments.

FIG. 8 is a top plan view illustrating a touch screen panel according to one or more exemplary embodiments. FIG. 9 is an enlarged top plan view of a portion "A" indicated in FIG. 8, according to one or more exemplary embodiments. FIG. 10 is an enlarged top plan view of a portion "B" indicated in FIG. 8, according to one or more exemplary embodiments.

For convenience of descriptions, an illustration of insulation patterns and an insulation layer is omitted in FIGS. 8, 9, and 10. Detailed descriptions on elements and/or structures substantially identical or similar to those illustrated with reference to FIGS. 1, 2, 3, 4, 5, 6, and 7 are omitted herein.

Referring to FIGS. 8 and 10, a substrate 100 may include a sensing region 210 and a wiring region 220. The sensing region 210 and the wiring region 220 may substantially correspond to the first region I and the second region II, respectively, illustrated with reference to FIG. 1.

First and second electrode patterns 112 and 114 may be arranged in the sensing region 210. The first electrode pattern 112 and the second electrode pattern 114 may serve as a sensing electrode and a driving electrode, respectively. Each of the first and second electrode patterns 112 and 114 may have a polygonal shape, e.g., a rectangular shape, a rhombus shape, etc., in a plane view.

A plurality of the first electrode patterns 112 may be arranged along the first direction to form a sensing electrode row, and a plurality of the sensing electrode rows may be arranged along the second direction. A plurality of the second electrode patterns 114 may be arranged along the second direction to form a driving electrode column, and a plurality of the driving electrode columns may be arranged along the first direction.

Referring to FIG. 9, the second electrode patterns 114 may be integrally connected to each other along the second direction by a connecting portion 115. Thus, a second electrode pattern column may have a reduced resistance, and may serve as the driving electrode column.

Referring back to FIG. 1, a first connecting conductive pattern 133 including a transparent conductive oxide such as ITO may be disposed as a bridge, and the first electrode patterns 112 disposed adjacent may be electrically connected to each other along the first direction.

Referring to FIG. 10, a plurality of second connecting conductive patterns 135 may be disposed on the first electrode pattern 112 adjacent to the wiring region 220, and a first wiring 140*a* may be disposed on the plurality of the second connecting conductive patterns 135. Accordingly, the plurality of the second connecting conductive patterns 135 may serve as a junction structure, and may establish an electrical connection between the first electrode pattern 112 and the first wiring 140*a*. A second wiring 140*b* may be spaced apart from the first wiring 140*a*, and may extend in parallel with the first wiring 140*a*. The first wiring 140*a* and the second wiring 140*b* may serve as a sensing line and a driving line, respectively.

According to one or more exemplary embodiments, the first wiring 140*a* may cover at least half of a top surface of the second connecting conductive pattern 135 in a plane view. Accordingly, a resistance between the first wiring 140*a* and the second connecting conductive pattern 135 may be reduced, and a signal delay may be reduced.

Referring back to FIG. 8, a peripheral circuit including pads 230 and 240 may be disposed in an outside region of the wiring region 220.

According to one or more exemplary embodiments, a first pad 230 may be electrically connected to the driving electrode column and/or the driving line. A second pad 240 may be electrically connected to the sensing electrode row and/or the sensing line. A capacitor may be formed between the first electrode pattern 112 and the second electrode pattern 114 disposed adjacent to each other. For example, a human hand or an object contacting the first electrode pattern 112 may change a capacitance of the capacitor. The capacitance change may be transferred to the pads 230 and 240. Accordingly, a positional contact signal may be converted into an electrical signal.

According to one or more exemplary embodiments, electrode patterns having fine thickness, fine pitch, and a flexible property may be include a metal nanowire. Insulation patterns and connecting conductive patterns including a transparent conductive oxide may be disposed on the electrode patterns, and then metal wiring may be formed. Accordingly, an etching damage to the electrode patterns may be reduced or prevented. Further, the connecting conductive patterns including the transparent conductive oxide may be disposed in openings defined by the insulation patterns. Thus, an interconnection structure such as a bridge or a junction structure may be have reduced damage during an etching process for forming the metal wiring. Therefore, a TSP may have improved mechanical stability, transparency, and flexibility.

The TSP may be implemented to a display device such as an OLED device. The TSP may be also implemented to various electronic devices including the display device such as a computer, a laptop, a mobile phone, a PMP, a PDA, a MP3 player, a digital camera, a video camcorder, etc.

In the claims, means-plus-function clauses are intended to cover the structures described herein as performing the recited function and not only structural equivalents but also equivalent structures. Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A touch screen panel, comprising:
a substrate;
electrode patterns disposed on the substrate;
insulation patterns disposed partially covering the electrode patterns, the insulation patterns defining openings, wherein at least a part of top surfaces of the electrode patterns are exposed through the openings;
connecting conductive patterns disposed on the insulation patterns, the connecting conductive patterns filling at least a part of the openings and being electrically connected to the electrode patterns; and
wirings comprising:
a first wiring disposed on at least a portion of the connecting conductive patterns, the at least portion of the connecting conductive patterns being interposed between the wirings and the insulation patterns; and
a second wiring disposed spaced apart from the first wiring and directly contacting a top surface of the substrate.

2. The touch screen panel of claim 1, wherein the electrode patterns comprise a metal nanowire.

3. The touch screen panel of claim 2, wherein the electrode patterns further comprise a photosensitive material.

4. The touch screen panel of claim 1, wherein the connecting conductive patterns comprise a transparent conductive oxide.

5. The touch screen panel of claim 4, wherein the connecting conductive patterns comprise at least one material selected from the group consisting of indium tin oxide (ITO), aluminum zinc oxide (AZO), aluminum tin oxide (ATO) and gallium zinc oxide (GZO).

6. The touch screen panel of claim 1, wherein the wirings comprise a metal.

7. The touch screen panel of claim 1, wherein the substrate comprises a plastic film.

8. The touch screen panel of claim 1, wherein the electrode patterns are in direct contact with a top surface of the substrate.

9. The touch screen panel of claim 8, wherein the connecting conductive patterns directly contact the electrode patterns, and the wirings directly contact the portion of the connecting conductive patterns.

10. The touch screen panel of claim 1, wherein the electrode patterns comprise first electrode patterns and second electrode patterns,
wherein a plurality of first electrode pattern rows comprises the first electrode patterns, and
wherein a plurality of second electrode pattern columns comprises the second electrode patterns, the plurality of second electrode pattern columns is disposed crossing the plurality of first electrode pattern rows.

11. The touch screen panel of claim 10, wherein the connecting conductive patterns comprise;
a first connecting conductive pattern connecting adjacent first electrode patterns of the first electrode patterns with respect to one of the second electrode pattern columns, and
a second connecting conductive pattern connecting a peripheral first electrode pattern of the first electrode patterns and the wirings.

12. The touch screen panel of claim 11, wherein the insulation patterns comprise a first insulation pattern disposed partially covering the electrode patterns, and a second insulation pattern disposed on a peripheral portion of the substrate and spaced apart from the electrode patterns,
wherein the first connecting conductive pattern is disposed on the first insulation pattern, and the second connecting conductive pattern and the wirings are disposed on the second insulation pattern.

13. The touch screen panel of claim 11, wherein the first wiring is contacting the second connecting conductive pattern.

14. A touch screen panel, comprising:
a substrate comprising a sensing region and a wiring region;
sensing electrode rows comprising sensing electrodes;
driving electrode columns comprising driving electrodes;
insulation patterns comprising openings through which sensing electrodes are partially exposed;
bridges electrically connecting adjacent sensing electrodes of the sensing electrodes in a row direction, the bridges filling at least a part of the openings of the insulation patterns;
a wiring disposed in the wiring region of the substrate, the wiring comprising a first wiring and a second wiring; and a junction structure disposed at a boundary between the sensing region and the wiring region, the junction structure electrically connecting a peripheral sensing electrode of the sensing electrodes and the first wiring, wherein the sensing electrode rows and the driving electrode columns are disposed crossing each other in the sensing region of the substrate, and wherein the first wiring completely overlaps with the junction structure.

15. The touch screen panel of claim 14, wherein the sensing electrode rows and the driving electrode columns comprise electrode patterns containing a metal nanowire.

16. The touch screen panel of claim 15, wherein the bridges and the junction structure comprise a transparent conductive oxide.

17. The touch screen panel of claim 14, wherein the junction structure is in direct contact with the peripheral sensing electrode and the wiring.

* * * * *